United States Patent [19]
Kraft

[11] 3,942,571
[45] Mar. 9, 1976

[54] TIRE SAFETY SUPPORT
[75] Inventor: Louis Seelback Kraft, Stow, Ohio
[73] Assignee: The Goodyear Tire & Rubber Company, Akron, Ohio
[22] Filed: Jan. 16, 1975
[21] Appl. No.: 541,524

[52] U.S. Cl. .......................... 152/158; 152/330 RF
[51] Int. Cl.² ................................................ B60C 17/04
[58] Field of Search ... 152/158, 152, 9, 81, 330 RF; 105/106 R

[56] References Cited
UNITED STATES PATENTS

| 939,638 | 11/1909 | Rowling | 152/158 |
|---|---|---|---|
| 1,704,002 | 3/1929 | Holmes | 152/158 |
| 3,029,748 | 4/1962 | Ingram | 105/406 R |
| 3,049,162 | 8/1962 | Rosenbaum et al. | 152/158 |
| 3,872,907 | 3/1975 | Curtiss, Jr. et al. | 152/158 |

FOREIGN PATENTS OR APPLICATIONS

| 956,380 | 1/1957 | Germany | 152/158 |
| 2,345,367 | 9/1973 | Germany | 152/158 |

*Primary Examiner*—Drayton E. Hoffman
*Attorney, Agent, or Firm*—F. W. Brunner; M. L. Gill; Frederick K. Lacher

[57] ABSTRACT

A tire safety support for mounting on a wheel rim to support a pneumatic tire in a deflated condition including a ring member mounted on the wheel rim inside the tire. The ring member has a tread support portion spaced radially outward from the rim which is radially deflectable when a radial load is applied to a deflated tire. A deflection limiting member is mounted on a rim-engaging portion of the ring and extends radially outward to a supporting surface spaced a predetermined distance from the tread support portion of the ring member to limit deflection of the tread support portion upon deflation of the tire.

8 Claims, 3 Drawing Figures

TIRE SAFETY SUPPORT

This invention relates to a novel and improved tire safety support mounted on a drop center wheel rim to support a pneumatic tire in a deflated condition.

Safety support rings for mounting on a wheel rim inside a tire have been made of materials permitting deflection of the ring supporting surface to minimize shock to the ball joints and other components of the vehicle. The support rings have been made in two segments in order to pass the rings through the beads of the tires. It has been found that the support rings deflect more at the ends of the segments and the ends have been made heavier to resist this deflection. Although this reinforcement has reduced deflection under normal loading, degradation of the support ring segments at the ends has been experienced when subjected to severe impact forces. This has reduced the life and effectiveness of the safety support rings.

An object of this invention is to provide a safety support with radially deflectable tread support portion and a radially extending member for limiting the deflection upon deflation of the tire.

Another object of the invention is to provide an enlarged surface on the deflection limiting member for engaging the tread support portion.

Still another object is to provide an engageable surface of the deflection limiting member which is shaped to conform with the tread support.

Another object is to provide brackets for connecting the ends of the segments and limiting deflection of the tread supporting portions of the ends during deflation of the tire.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 1:
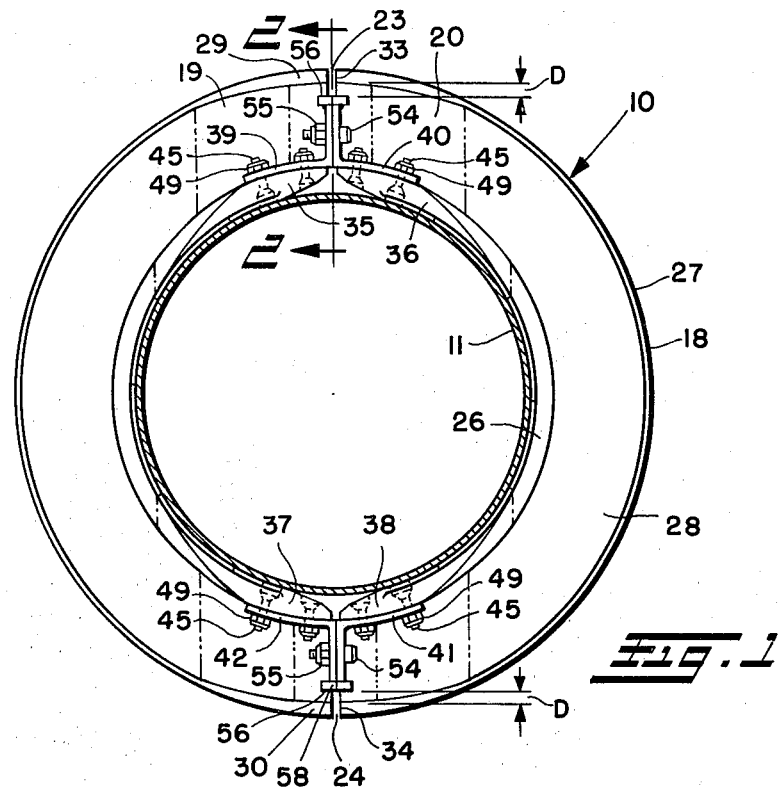
FIG. 1 is a cross-sectional view taken along the plane of line 1—1 of FIG. 2 showing a side elevation of one embodiment of the tire support device of the invention mounted on a rim.
Figure 2:
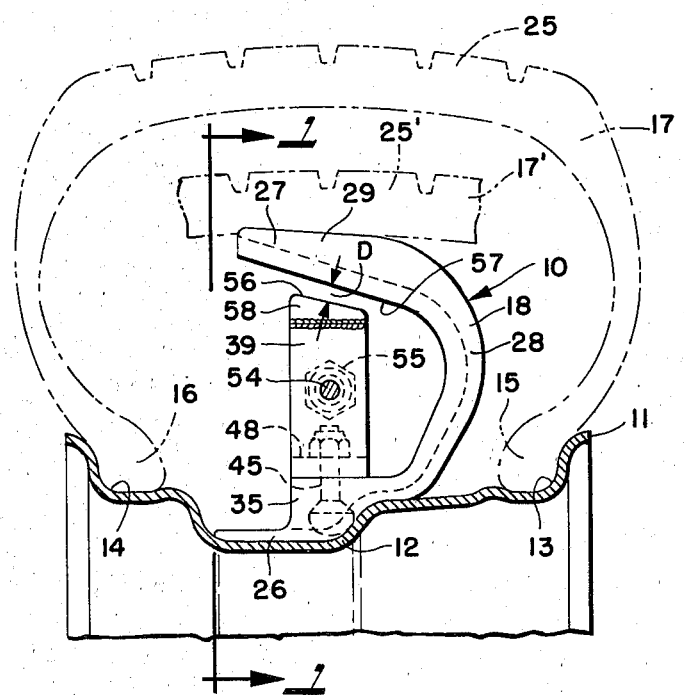
FIG. 2 is a cross-sectional view taken along the plane of line 2—2 of FIG. 1 and showing the contour of a tire mounted on the rim in the inflated and deflated condition in chain-dotted lines.

Referring to the drawings and particularly to FIGS. 1 and 2, a tire safety support assembly 10 is shown mounted on a vehicle wheel rim 11 which may be of the drop center type. The wheel rim 11 has a drop center portion 12 with bead seat portions 13 and 14 on each side thereof for receiving tire beads 15 and 16, respectively, of a tire 17 shown in the inflated condition in chain-dotted lines.

The tire safety support assembly 10 includes an annular ring member 18 having a substantially C-shaped cross section and being divided into two halves 19 and 20 by radial slots 23 and 24. Each half 19 and 20 is made as a single unitary piece preferably of a material such as fiberglass reinforced plastic. However, other materials may be used if they have the required physical properties and especially the radial deflection for cushioning the vehicle when the tire 17 is deflated and in engagement with the ring member 18 as indicated by numeral 17' in FIG. 2. The tire 17 has a tread portion 25 which, in the inflated condition, is spaced from the ring member 18 a distance such that there will be no contact with the tire under normal driving conditions including deflections caused by bumps, chuck holes or other obstructions in the road. The tread portion 25' of the deflated tire 17', as shown in FIG. 2, normally contacts the annular ring member 18 at the underside of the wheel when there is substantial underinflation or deflation of the tire.

The ring member 18 has a rim-engaging portion 26 for seating in the drop center portion 12 of the rim 11. A tread support portion 27 of the ring member 18 is spaced radially outward from the rim-engaging portion 26 and connected to the rim-engaging portion by an intermediate portion 28. With this C-shaped cross section the halves 19 and 20 of the ring member 18 provide deflection of the tread support portion 27 upon deflation of the tire 17. This deflection may be reduced at ends 29 and 30 of the ring member half 19 and ends 33 and 34 of the ring member half 20. As shown in dotted lines in FIG. 2, the thickness of the ring member half 19 between the ends 29 and 30 is substantially reduced.

The increased thickness of the ends 29, 30 and 33, 34 at the rim-engaging portion 26 provides curved base portions 35, 36, 37 and 38 shown in FIGS. 1 and 2 on which deflection limiting members such as brackets 39, 40, 41 and 42 may be mounted. Bolts 45 extend from the base portions 35–38 through holes 46 and 47 in curved base leg 48 of each of the brackets 39–42 and are held against the base portions 35–38 by nuts 49 threaded on the bolts.

Figure 3:
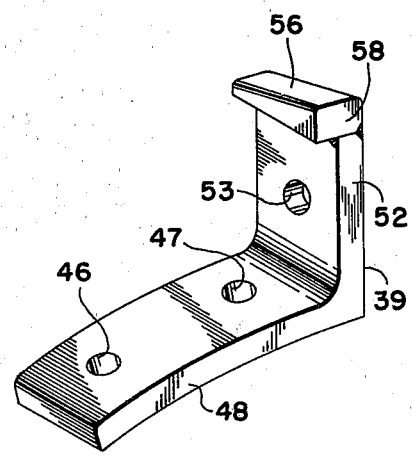
FIG. 3 is an enlarged perspective view of the deflection limiting bracket of this invention.

Bracket 39 is shown in perspective in FIG. 3; however, the other brackets 40–42 are similar in construction. The brackets 39–42 have a support leg 52 extending from the base leg 48 at an angle of substantially 90° to a plane tangent to the arc of the curve of the base leg as shown in FIGS. 1 and 3. A hole 53 in the support leg 52 is provided to receive a bolt 54 extending through abutting brackets 39 and 40 at slot 23 in the ring member 18 and abutting brackets 41 and 42 at slot 24 in the ring member. Nuts 55 are threaded on the bolts 54 to clamp the abutting brackets 39, 40 and 41, 42 together and thereby connect the ends 29, 33 and 30, 34 of the halves 19 and 20 to provide a unitary ring member 18.

As shown in FIGS. 1 and 2, the brackets 39–42 extend radially outward and terminate at a radially outer supporting surface 56 spaced a predetermined distance D from radially inner surface 57 of the tread support portion 27, as shown in FIG. 2. The distance D, which in this embodiment is around ¼ inch, permits deflection of the tread support portion 27 at the ends 29, 30, 33 and 34 of the ring member halves 19 and 20 but limits this deflection to an amount which will prevent flexing of the material of the ring member 18 beyond its elastic limit.

As shown in FIG. 3, the radially outer supporting surface 56 of the brackets 39–42 may be enlarged by a shoe 58 mounted on the end of the support leg 52 extending outwardly from the support leg in a direction generally parallel to the base leg 48. In the embodiment shown, the tread support portion 27 has a radially inner surface 57 with a generally frusto-conical configuration and the radially outer supporting surface 56 on the shoe 58 is sloped relative to the surface of the base leg 48 to provide a generally frusto-conical configuration for engagement with the radially inner surface of the tread support portion. The supporting surface 56 of the shoes 58 of brackets 39 and 41 would be sloped in the same direction while the supporting surface of the shoes 58 of brackets 40 and 42 would be sloped in the opposite direction. This provides a distribution of the supporting force over a substantial area upon engagement of the tread support portion 27 with the brackets 39–42.

In operation, the brackets 39 and 42 are bolted to the ring member half 19 by bolts 45 and nuts 49. The brackets 40 and 41 are bolted to the ring member half 20 by bolts 45 and nuts 49. Bead 15 of tire 17 is mounted on the drop center rim 11 after which the two halves 19 and 20 of the ring member 28 are mounted in the drop center portion 12 of the rim and bolted together by bolts 54 and nuts 55. The tire bead 16 is then pulled over the rim 11 using the drop center portion 12 and the space next to the rim-engaging portion 26 to provide the necessary clearance for mounting this bead. The tire 17 is then inflated in a manner well known to the art through a valve (not shown) extending through the rim 11. Under normal operation of the tire 17, the tread portion 25 will deflect but will not engage the tread support portion 27 of the ring member 18.

Upon deflation of the tire 17', the tread portion 25', as shown in FIG. 2, will engage the tread support portion 27 of the ring member 18 and because of the resilient nature of the ring member, deflection in the radial direction will take place to cushion the vehicle from impacts caused by bumps and other irregularities in the road surface. The ends 29 and 30 of ring member half 19 and the ends 33 and 34 of ring member half 20 will tend to deflect more than the tread support portion 27 between the ends because of the slots 23 and 24 in the ring member 18. If this deflection exceeds the distance D shown in FIG. 2, the radially inner surface 57 of the tread support portion 27 will engage the radially outer supporting surface 56 of the brackets 39–42 42 limiting the deflection and preventing flexing of the material beyond the elastic limit. In this manner the advantages of a radially deflecting ring member 18 are provided with a construction made up of two halves 19 and 20 which can be assembled within a rim 11 of the drop center type.

While certain representative embodiments and details have been shown for the purpose of illustrating the invention, it will be apparent to those skilled in the art that various changes and modifications may be made therein without departing from the invention.

What is claimed is:

1. A tire safety support for use on a wheel rim to support a pneumatic tire mounted thereon in a deflated condition comprising a ring member mountable on a wheel rim inside the tire, said ring member including a rim-engaging portion, an axially extending tire tread support portion spaced radially outward from said rim-engaging portion for supporting a portion of the tire tread from the inside thereof when deflated, an intermediate portion joining said rim-engaging portion and said tread support portion, said tread support portion being radially deflectable when a radial load is applied thereto by a deflated tire, said ring member having at least one radial split extending therethrough to permit the ring to pass through the bead of the tire, a radially extending deflection limiting member mounted on said rim engaging portion and extending radially towards said tread support portion, said deflection limiting member having a radially outer supporting surface spaced a predetermined distance from said tread support portion to limit the deflection of said tread support portion.

2. A tire safety support according to claim 1 wherein said radially outer supporting surface of said deflection limiting member further comprises the surface of a shoe mounted on said deflection limiting member.

3. A tire safety support according to claim 2 wherein said tread support portion has a radially inner surface with a generally frusto-conical configuration and said supporting surface of said deflection limiting member has a generally frusto-conical configuration to conform with said radially inner surface of said tread support portion upon engagement thereof.

4. A tire safety support according to claim 1 wherein fastening means connect the ends of said ring member at said radial split and said fastening means include said deflection limiting member.

5. A tire safety support according to claim 4 wherein said fastening means further comprises a pair of angle brackets mounted on said rim-engaging portion at said ends of said ring member, said angle brackets having radially extending legs disposed in abutting relationship, a removable fastener connecting said legs and at least one of said legs including said radially outer supporting surface spaced a predetermined distance from said tread support portion to limit the deflection of said tread support portion of said ring member.

6. A deflection limiting member for use on a radially deflectable tire safety support mounted on a wheel rim to support the tire in a deflated condition comprising an angle bracket having a curved base leg for mounting on a circumferentially extending surface of said support, a support leg extending from said base leg at an angle of substantially 90° to a plane tangent to the arc of the curve of said base leg and a shoe mounted on the end of said support leg for engagement by said tire safety support to limit the deflection of said tire safety support caused by forces acting on the tire during deflation.

7. A deflection limiting member according to claim 6 wherein said shoe extends outwardly from said support leg in a direction generally parallel to said plane tangential to the arc of said base leg.

8. A deflection limiting member according to claim 6 wherein said shoe has an outer surface for engagement by said tire safety support and said surface is sloped relative to the surface of said base leg to conform with the slope of the opposing surface of said tire safety support.

* * * * *

UNITED STATES PATENT OFFICE
CERTIFICATE OF CORRECTION

PATENT NO. : 3,942,571
DATED : March 9, 1976
INVENTOR(S) : Louis Seelbach Kraft

It is certified that error appears in the above-identified patent and that said Letters Patent are hereby corrected as shown below:

The spelling of the inventor's name is corrected to read as follows:

Louis Seelbach Kraft

Signed and Sealed this

Fourth Day of July 1978

[SEAL]

Attest:

RUTH C. MASON
Attesting Officer

DONALD W. BANNER
Commissioner of Patents and Trademarks